(12) United States Patent
Tang

(10) Patent No.: US 11,350,420 B2
(45) Date of Patent: May 31, 2022

(54) COMMUNICATION METHOD AND DEVICE

(71) Applicant: GUANGDONG OPPO MOBILE TELECOMMUNICATIONS CORP., LTD., Guangdong (CN)

(72) Inventor: Hai Tang, Guangdong (CN)

(73) Assignee: GUANGDONG OPPO MOBILE TELECOMMUNICATIONS CORP., LTD., Guangdong (CN)

(*) Notice: Subject to any disclaimer, the term of this patent is extended or adjusted under 35 U.S.C. 154(b) by 30 days.

(21) Appl. No.: 17/021,830

(22) Filed: Sep. 15, 2020

(65) Prior Publication Data
US 2021/0007108 A1 Jan. 7, 2021

Related U.S. Application Data

(63) Continuation of application No. PCT/CN2018/079358, filed on Mar. 16, 2018.

(51) Int. Cl.
*H04W 72/04* (2009.01)
*H04W 76/27* (2018.01)
(Continued)

(52) U.S. Cl.
CPC ....... *H04W 72/0493* (2013.01); *H04L 5/0051* (2013.01); *H04L 5/10* (2013.01);
(Continued)

(58) Field of Classification Search
CPC ..... H04W 72/00; H04W 72/02; H04W 72/04; H04W 72/453; H04W 72/0493;
(Continued)

(56) References Cited

U.S. PATENT DOCUMENTS 8,279,823 B2 * 10/2012 Stanforth .............. H04W 16/14
370/329
8,874,124 B2 10/2014 Clegg
(Continued)

FOREIGN PATENT DOCUMENTS

CN 102232307 A 11/2011
CN 103517456 A 1/2014
(Continued)

OTHER PUBLICATIONS

International Search Report in the international application No. PCT/CN2018/079358, dated Dec. 6, 2018.
(Continued)

*Primary Examiner* — Warner Wong
(74) *Attorney, Agent, or Firm* — Perkins Coie LLP

(57) ABSTRACT

Provided are a communication method and device. The method includes: a terminal device receives, from a network device, indication information indicating a working frequency band attribute or system attribute of the network device, the working frequency band attribute representing whether a working frequency band of the network device is a licensed or unlicensed frequency band and the system attribute representing whether the network device works in a licensed or unlicensed frequency band system; and the terminal device performs communication with the network device according to the working frequency band attribute or the system attribute. When roaming in different countries or regions, the terminal device can effectively know whether a frequency band of a network presently to access is an unlicensed or licensed frequency band and thus execute an operation to implement effective data transmission in different frequency bands even though different spectrum division manners are adopted there.

17 Claims, 3 Drawing Sheets

(51) Int. Cl.
*H04L 5/00* (2006.01)
*H04L 5/10* (2006.01)
*H04L 27/26* (2006.01)
*H04W 16/14* (2009.01)
*H04W 56/00* (2009.01)
*H04W 74/08* (2009.01)
*H04W 76/16* (2018.01)
*H04W 28/18* (2009.01)

(52) U.S. Cl.
CPC ......... *H04L 27/2607* (2013.01); *H04W 16/14* (2013.01); *H04W 56/001* (2013.01); *H04W 72/042* (2013.01); *H04W 72/0453* (2013.01); *H04W 72/0466* (2013.01); *H04W 74/0808* (2013.01); *H04W 76/27* (2018.02); *H04W 28/18* (2013.01); *H04W 76/16* (2018.02)

(58) Field of Classification Search
CPC ..... H04W 16/00; H04W 16/14; H04W 72/04; H04W 72/042; H04W 72/044; H04W 56/00; H04W 56/001; H04W 74/00; H04W 74/08; H04W 74/088; H04W 27/0601; H04W 27/2607; H04W 74/0808; H04W 72/0466; H04W 76/20; H04W 76/27; H04W 76/10; H04W 76/16; H04W 28/18; H04L 5/02; H04L 5/06; H04L 5/10; H04L 5/003; H04L 5/0051; H04L 29/06537; H04L 29/08576; H04L 69/24; H04L 5/1438; H04L 5/0098

See application file for complete search history.

(56) References Cited

U.S. PATENT DOCUMENTS

| | | | |
|---|---|---|---|
| 9,215,715 B2 | 12/2015 | Liu et al. | |
| 9,549,360 B2* | 1/2017 | Khawer | H04W 36/06 |
| 9,591,633 B2 | 3/2017 | Clegg | |
| 9,794,794 B2 | 10/2017 | Clegg | |
| 10,080,177 B2* | 9/2018 | Carichner | H04W 40/02 |
| 2003/0119490 A1* | 6/2003 | Mohammed | H04W 4/16 |
| | | | 455/414.1 |
| 2003/0181213 A1* | 9/2003 | Sugar | H04W 72/0406 |
| | | | 455/454 |
| 2005/0186948 A1* | 8/2005 | Gallagher | H04W 16/16 |
| | | | 455/414.1 |
| 2006/0009219 A1* | 1/2006 | Jaakkola | H04W 4/029 |
| | | | 455/435.2 |
| 2006/0198347 A1* | 9/2006 | Hurtta | H04W 28/16 |
| | | | 370/338 |
| 2009/0258597 A1* | 10/2009 | Chen | H04W 16/14 |
| | | | 455/41.2 |
| 2011/0164538 A1* | 7/2011 | Karr | H04W 16/14 |
| | | | 370/281 |
| 2011/0287794 A1* | 11/2011 | Koskela | H04W 28/08 |
| | | | 455/509 |
| 2013/0337821 A1 | 12/2013 | Clegg | |
| 2014/0120975 A1 | 5/2014 | Liu et al. | |
| 2014/0378157 A1* | 12/2014 | Wei | H04W 16/14 |
| | | | 455/454 |
| 2015/0009869 A1 | 1/2015 | Clegg | |
| 2015/0009962 A1 | 1/2015 | Clegg | |
| 2016/0037503 A1 | 2/2016 | Wu | |
| 2016/0095129 A1* | 3/2016 | Hoyhtya | H04W 72/0446 |
| | | | 370/330 |
| 2016/0269945 A1* | 9/2016 | Jang | H04W 72/1273 |
| 2017/0048916 A1* | 2/2017 | Yoo | H04B 17/318 |
| 2017/0094529 A1 | 3/2017 | Clegg | |
| 2017/0164247 A1 | 6/2017 | Wiemann et al. | |
| 2017/0238319 A1* | 8/2017 | Luft | H04W 72/085 |
| | | | 370/329 |
| 2017/0245300 A1* | 8/2017 | Chien | H04W 72/044 |
| 2017/0257777 A1 | 9/2017 | Clegg | |
| 2017/0265084 A1 | 9/2017 | Clegg | |
| 2017/0273084 A1* | 9/2017 | Yi | H04W 72/0453 |
| 2017/0366679 A1* | 12/2017 | Mohamed | H04M 15/66 |
| 2018/0035487 A1* | 2/2018 | Khan | H04W 88/06 |
| 2019/0029047 A1* | 1/2019 | Zhu | H04W 74/0816 |
| 2019/0110293 A1* | 4/2019 | Li | H04W 72/1226 |
| 2019/0191315 A1* | 6/2019 | Mukherjee | H04W 24/10 |
| 2019/0281470 A1* | 9/2019 | Li | H04W 56/0045 |
| 2019/0380042 A1* | 12/2019 | Niu | H04W 52/48 |
| 2020/0037277 A1* | 1/2020 | Huang | H04W 72/02 |
| 2020/0305025 A1* | 9/2020 | Liu | H04W 72/04 |
| 2020/0374910 A1* | 11/2020 | Kim | H04W 74/0808 |
| 2021/0153250 A1* | 5/2021 | Jiang | H04W 56/001 |
| 2021/0195636 A1* | 6/2021 | Wang | H04W 72/1268 |
| 2021/0345332 A1* | 11/2021 | He | H04W 72/0453 |

FOREIGN PATENT DOCUMENTS

| | | |
|---|---|---|
| CN | 106304148 A | 1/2017 |
| CN | 106355860 A | 1/2017 |
| EP | 2981018 A1 | 2/2016 |
| WO | 2017124770 A1 | 7/2017 |

OTHER PUBLICATIONS

Supplementary European Search Report in the European application No. 18909835.3, dated Dec. 9, 2020.
Written Opinion of the International Search Authority in the international application No. PCT/CN2018/079358, dated Dec. 6, 2018.
First Office Action of the European application No. 18909835.3, dated Oct. 1, 2021. 6 pages.

* cited by examiner

COMMUNICATION METHOD AND DEVICE

CROSS-REFERENCE TO RELATED APPLICATION

This application is a continuation of International Patent Application No. PCT/CN2018/079358, filed on Mar. 16, 2018, the entire content of which is incorporated herein by reference.

TECHNICAL FIELD

Embodiments of the disclosure relate to the field of communication, and more particularly to a communication method and device.

BACKGROUND

A 5th-Generation (5G) system supports data transmission in unlicensed frequency bands. A terminal device may execute different operations for communication in an unlicensed frequency bands system and a licensed frequency bands system. In an example, in an unlicensed frequency bands system, a terminal device may need to communicate in a listen before talk (LBT) manner. Namely, whether a channel is idle or not is listened before data is sent and the data can be sent only when it is determined that the channel is idle.

However, out of different considerations, organizations for spectrum supervision and allocation in different countries make different spectrum plans and allocations. In an example, 3.5 GHz is a licensed New Radio (NR) frequency band in China but is an unlicensed frequency band in the United States. Similarly, 37 GHz may be classified as a licensed NR frequency band in China but may be classified as an unlicensed frequency band in the United States. Therefore, the difference in spectrum allocation may cause a terminal device to not effectively perform communication when roaming in different countries or regions.

SUMMARY

The embodiments of the disclosure provide a communication method and device. When a terminal device roams in different countries or regions, the terminal device can effectively communicate even though different spectrum allocations are adopted for licensed frequency bands and unlicensed frequency bands in different countries or regions.

A first aspect provides a communication method, which may include that:

a terminal device receives indication information from a network device, the indication information being configured to indicate a working frequency band attribute or system attribute of the network device, the working frequency band attribute being configured to represent whether a working frequency band of the network device is a licensed frequency band or an unlicensed frequency band and the system attribute being configured to represent whether the network device works in a licensed frequency band system or an unlicensed frequency band system; and the terminal device performs communication with the network device according to the working frequency band attribute or the system attribute.

A second aspect provides a communication method, which may include that:

a network device sends indication information to a terminal device, the indication information being configured to indicate a working frequency band attribute or system attribute of the network device, the working frequency band attribute being configured to represent whether a working frequency band of the network device is a licensed frequency band or an unlicensed frequency band and the system attribute being configured to represent whether the network device works in a licensed frequency band system or an unlicensed frequency band system; and the network device performs communication with the terminal device according to the working frequency band attribute or the system attribute.

A third aspect provides a terminal device, which may execute the operations of a receiving node in the first aspect or any optional implementation mode of the first aspect. Specifically, the terminal device may include modular units configured to execute the operations of the receiving node in the first aspect or any possible implementation mode of the first aspect.

A fourth aspect provides a network device, which may execute operations of a sending node in the first aspect or any optional implementation mode of the first aspect. Specifically, the network device may include modular units configured to execute the operations of the sending node in the second aspect or any possible implementation mode of the second aspect.

A fifth aspect provides a terminal device, which includes a processor, a transceiver and a memory. The processor, the transceiver and the memory can communicate with one another through an internal connecting path. The memory is configured to store instructions, and the processor is configured to execute the instructions stored in the memory. When the processor executes the instructions stored in the memory, such execution enables the terminal device to implement the method in the first aspect or any possible implementation mode of the first aspect, or such execution enables the terminal device to act as the terminal device provided in the third aspect.

A sixth aspect provides a network device, which includes a processor, a transceiver and a memory. The processor, the transceiver and the memory communicate with one another through an internal connecting path. The memory is configured to store instructions, and the processor is configured to execute the instructions stored in the memory. When the processor executes the instructions stored in the memory, such execution enables the network device to implement the method in the second aspect or any possible implementation mode of the second aspect, or such execution enables the network device to act as the network device provided in the fourth aspect.

A seventh aspect provides a system chip, which includes an input interface, an output interface, a processor and a memory. The processor is configured to execute instructions stored in the memory. When the instructions are executed, the processor may implement the method in the first aspect or any possible implementation mode of the first aspect.

An eighth aspect provides a system chip, which includes an input interface, an output interface, a processor and a memory. The processor is configured to execute instructions stored in the memory. When the instructions are executed, the processor may implement the method in the second aspect or any possible implementation mode of the second aspect.

A ninth aspect provides a computer program product including instructions, which runs in a computer to cause the computer to implement the method in the first aspect or any possible implementation mode of the first aspect.

A tenth aspect provides a computer program product including instructions, which runs in a computer to cause the computer to implement the method in the second aspect or any possible implementation mode of the second aspect.

DETAILED DESCRIPTION

The technical solutions of the embodiments of the disclosure may be applied to various communication systems, for example, a Global System of Mobile Communication (GSM), a Code Division Multiple Access (CDMA) system, a Wideband Code Division Multiple Access (WCDMA) system, a General Packet Radio Service (GPRS), a Long Term Evolution (LTE) system, an LTE Frequency Division Duplex (FDD) system, LTE Time Division Duplex (TDD), a Universal Mobile Telecommunication System (UMTS), a Worldwide Interoperability for Microwave Access (WiMAX) communication system or a future 5G system.

Figure 1:
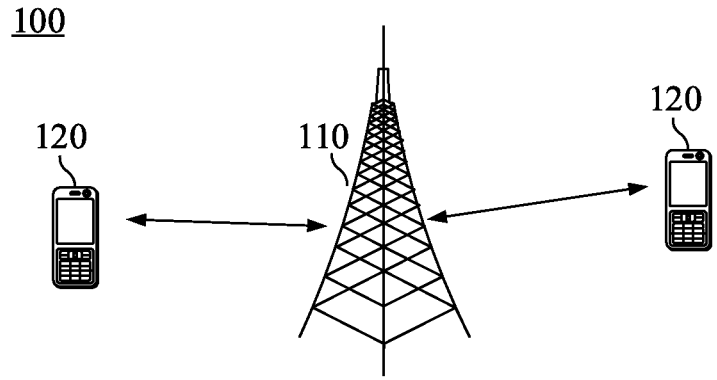
FIG. 1 is a schematic diagram of a wireless communication system to which the embodiments of the disclosure are applied.

FIG. 1 illustrates a wireless communication system 100 to which the embodiments of the disclosure are applied. The wireless communication system 100 may include a network device 110. The network device 110 may be a device capable of communicating with a terminal device. The network device 110 may provide communication coverage for a specific geographical region and can communicate with a terminal device (for example, User Equipment (UE)) in the coverage. Optionally, the network device 110 may be a Base Transceiver Station (BTS) in a GSM or CDMA system, may also be a NodeB (NB) in a WCDMA system, or may be an Evolutional Node B (eNB or eNodeB) in a LTE system or a wireless controller in a Cloud Radio Access Network (CRAN). Or the network device may be a relay station, an access point, a vehicle device, a wearable device, a network-side device in a future 5G network, a network device in a future evolved Public Land Mobile Network (PLMN) or the like.

The wireless communication system 100 further includes at least one terminal device 120 within the coverage of the network device 110. The terminal device 120 may be mobile or fixed. Optionally, the terminal device 120 may be an access terminal, UE, a user unit, a user station, a mobile station, a mobile radio station, a remote station, a remote terminal, a mobile device, a user terminal, a terminal, a wireless communication device, a user agent or a user device. The access terminal may be a cell phone, a cordless phone, a Session Initiation Protocol (SIP) phone, a Wireless Local Loop (WLL) station, a Personal Digital Assistant (PDA), a handheld device with a wireless communication function, a computing device, another processing device connected to a wireless modem, a vehicle device, a wearable device, a terminal device in a future 5G network, a terminal device in a future evolved PLMN or the like. Optionally, the terminal device 120 can also perform Device to Device (D2D) communication.

One network device and two terminal devices are exemplarily shown in FIG. 1. Optionally, the wireless communication system 100 may include multiple network devices and another number of terminal devices, other than two, may be included in coverage of each network device. There are no limits made thereto in the embodiments of the disclosure.

Optionally, the wireless communication system 100 may further include another network entity such as a network controller, a mobility management entity and so on. There are no limits made thereto in the embodiments of the disclosure.

Organizations for spectrum supervision and allocation in different countries make different spectrum plans and allocations out of different considerations. In an example, 3.5 GHz is a licensed NR frequency band in China but is an unlicensed frequency band in the United States. For another example, 37 GHz may be classified as a licensed NR frequency band in China but may be classified as an unlicensed frequency band in the United States.

Such differences in spectrum allocation may cause a situation that, when a terminal device roams in different countries or regions, unlicensed frequency band systems are deployed in some countries or regions while licensed frequency band systems are deployed in some other countries or regions in a same frequency band (for example, a 3.5 GHz frequency band). In an unlicensed frequency band, due to an LBT mechanism, a synchronous signal block (SSB or SS Block) bearing a synchronous signal and a physical broadcast channel (PBCH) may be sent successfully or unsuccessfully at a certain probability. Remaining minimum system information (RMSI) associated with the SSB may also be sent successfully or unsuccessfully at a certain probability. The LBT mechanism needs to be adopted for uplink transmission of the terminal device. Uplink transmission of the terminal device needs to meet a requirement on restriction of a power spectral density and the like. Therefore, an operation performed by a terminal device in an unlicensed frequency band system may be different from an operation performed by the terminal device in a licensed frequency band system.

Therefore, if different spectrum division manners are adopted in different countries or regions, a terminal device cannot effectively communicate when the terminal device roams in different countries or regions.

Therefore, it is proposed in the embodiments of the disclosure that a network device indicates a working frequency band attribute or system attribute of the network device to a terminal device, and then the terminal device determines whether a working frequency band of the network device is a licensed frequency band or an unlicensed frequency band according to the working frequency band attribute indicated by the network device and thus can correspondingly perform an operation in the licensed frequency band or the unlicensed frequency band, or, the terminal device determines whether the network device works in a licensed frequency band system or an unlicensed frequency band system according to the system attribute indicated by the network device and thus can correspondingly perform an operation in the licensed frequency band system or the unlicensed frequency band system. Therefore, effective data transmission is implemented.

Figure 2:
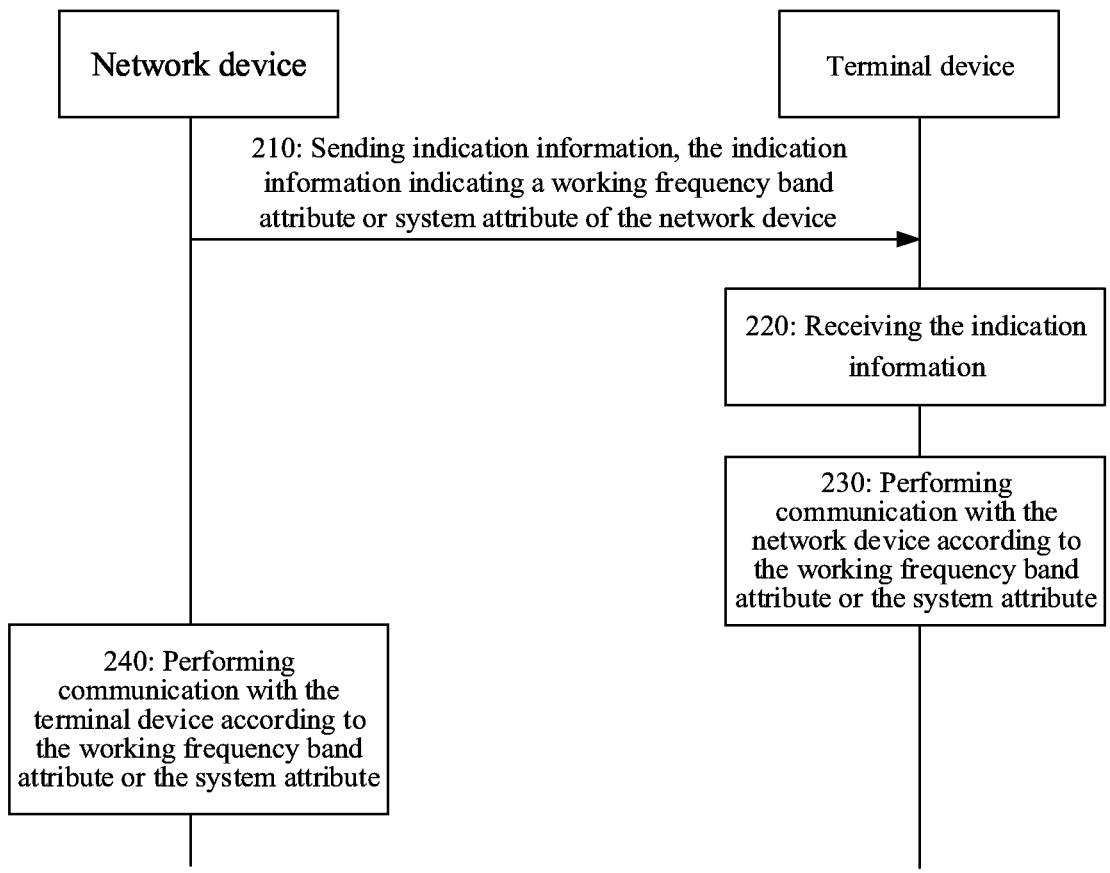
FIG. 2 is an interaction flowchart of a communication method according to an embodiment of the disclosure.

FIG. 2 is an interaction flowchart of a communication method according to an embodiment of the disclosure. A terminal device shown in FIG. 2 may be, for example, the terminal device 120 as shown in FIG. 1. A network device shown in FIG. 2 may be, for example, the network device 110 as shown in FIG. 1. As shown in FIG. 2, the communication method may include part or all of the following contents.

In 210, the network device sends indication information to the terminal device, the indication information indicating a working frequency band attribute or system attribute of the network device.

The working frequency band attribute may represent whether a working frequency band of the network device is a licensed frequency band or an unlicensed frequency band, and the system attribute may represent whether the network device works in a licensed frequency band system or an unlicensed frequency band system.

In 220, the terminal device receives the indication information from the network device.

In 230, the terminal device performs communication with the network device according to the working frequency band attribute or the system attribute.

In 240, the network device performs communication with the terminal device according to the working frequency band attribute or the system attribute.

Specifically, the terminal device may receive the indication information from the network device, and there is made such a hypothesis that the indication information indicates the working frequency band attribute of the network device. The working frequency band attribute of the network device may represent whether a frequency band supported by the network device is a licensed frequency band or an unlicensed frequency band. When the working frequency band of the network device is the licensed frequency band, the terminal device may perform a corresponding communication operation in the licensed frequency band, for example, performing data transmission with the network device based on a resource configured by the network device. When the working frequency band of the network device is the unlicensed frequency band, the terminal device may perform a corresponding communication operation in the unlicensed frequency band, for example, listening whether a channel is idle or not in an LBT manner and performing data transmission after determining that the channel is idle.

The terminal device may receive the indication information from the network device, and there is made such a hypothesis that the indication information indicates the system attribute of the network device. The system attribute of the network device may represent whether a system where the network device is located is the unlicensed frequency band system (an unlicensed NR system) or the licensed frequency band system (a licensed NR system). When the network device works in the licensed frequency band system, the terminal device may perform the corresponding communication operation in the licensed frequency band, for example, performing data transmission with the network device based on a resource configured by the network device. When the network device works in the unlicensed frequency band system, the terminal device may perform a corresponding communication operation in the unlicensed frequency band, for example, listening whether a channel is idle or not based on the LBT manner and performing data transmission after determining that the channel is idle.

It is to be understood that: the network device works in the licensed frequency band system when the working frequency band of the network device is the licensed frequency band, and the network device works in the unlicensed frequency band system when the working frequency band of the network device is the unlicensed frequency band.

Accordingly, the network device may indicate the working frequency band attribute or system attribute of the network device to the terminal device, and the terminal device may determine whether the working frequency band of the network device is the licensed frequency band or the unlicensed frequency band according to the working frequency band attribute indicated by the network device and thus can correspondingly perform an operation in the licensed frequency band or the unlicensed frequency band, or, the terminal device may determines whether the network device works in the licensed frequency band system or the unlicensed frequency band system according to the system attribute indicated by the network device and thus can correspondingly perform an operation in the licensed frequency band system or the unlicensed frequency band system. Therefore, effective data transmission is implemented.

Optionally, the indication information may include, but not limited to any one of a PSS in an SSB (or Synchronization Signal (SS) block), a Secondary Synchronization Signal (SSS) in the SSB, a PBCH in the SSB, RRC signaling, RMSI and Other System Information (OSI).

That is, the network device may indicate the working frequency band attribute or system attribute of the network device to the terminal device through information such as the PSS, the SSS, the PBCH, the RMSI or the OSI. Specifically, the network device may implicitly or explicitly indicate the working frequency band attribute or system attribute of the network device through the information.

A first manner is: implicit indication

The implicit indication manner of the network device will specifically be described below with the conditions that the indication information is the PSS or the PBCH as examples.

Optionally, the indication information is the PSS.

Before 210, the network device determines, according to the working frequency band attribute or the system attribute of the network device, a sequence configured to generate the indication information and generates the indication information based on the sequence.

Correspondingly, before 220, the terminal device may determine the working frequency band attribute or system attribute of the network device based on the sequence configured to generate the indication information.

The sequence configured to generate the indication information may be a first sequence when the working frequency band of the network device is the licensed frequency band or the network device works in the licensed frequency band system, the sequence configured to generate the indication information may be a second sequence when the working frequency band of the network device is the unlicensed frequency band or the network device works in the unlicensed frequency band system, and the first sequence and the second sequence are different sequences.

That is, under situations that the working frequency band of the network device is the licensed frequency band and the working frequency band of the network device is the unlicensed frequency band, the network device may adopt different sequences to generate the PSS. Or, under situations that the network device works in the licensed frequency band system and the network device works in the unlicensed frequency band system, the network device may adopt different sequences to generate the PSS. The terminal device may determine the working frequency band attribute or system attribute of the network device based on the sequence for generation of the PSS.

Furthermore, cyclic shift values of the different sequences are optionally different.

In an example, when the working frequency band of the network device is the licensed frequency band or the network device works in the licensed frequency band system, the first sequence configured to generate the PSS is:

$$d_{PSS}(n)=1-2x(m),$$

where m=(n+43$N_{ID}^{(2)}$) mod 127, and 0≤n<127, where x(i+7)=x((i+4)+x(i))mod 2, and [x(6) x(5) x(4) x(3) x(2) x(1)]=[1 1 1 0 1 1 0].

It can be seen that the sequence m is adopted to generate the PSS, and three cyclic shift values in terms of frequency are 0, 43 and 86 respectively.

When the working frequency band of the network device is the unlicensed frequency band or the network device works in the unlicensed frequency band system, the second sequence configured to generate the PSS is:

$$d_{PSS}(n)=1-2x(m),$$

where m=(n+43$N_{ID}^{(2)}$+offset)mod 127, and 0≤n<127.

In such case, the three cyclic shift values in terms of frequency are 0+offset, 43+offset and 86+offset respectively. Herein, if offset=22, the three cyclic shift values are 22, 65 and 108 respectively.

Then, the terminal device can determine the sequence $d_{PSS}$ for generation of the PSS by detecting the PSS sent by the network device. For different working frequency band attributes or different system attributes of the network device, the sequences m are different, and thus the sequences $d_{PSS}$ are also different. Therefore, the terminal device can determine the working frequency band attribute or system attribute of the network device according to different sequences $d_{PSS}$.

Optionally, the indication information is the PBCH.

Before 210, the network device determines, according to the working frequency band attribute or the system attribute of the network device, a DMRS sequence configured to modulate the indication information and modulates the indication information based on the DMRS sequence.

Correspondingly, before 220, the terminal device can determine the working frequency band attribute or system attribute of the network device based on the DMRS sequence for demodulating the indication information.

The sequence configured to generate the indication information may be a first sequence when the working frequency band of the network device is the licensed frequency band or the network device works in the licensed frequency band system, the sequence configured to generate the indication information may be a second sequence when the working frequency band of the network device is the unlicensed frequency band or the network device works in the unlicensed frequency band system, and the first sequence and the second sequence may be different sequences.

That is, under situations that the working frequency band of the network device is the licensed frequency band and the working frequency band of the network device is the unlicensed frequency band, the network device may adopt different DMRS sequences to modulate the indication information. Or, under situations that the network device works in the licensed frequency band system and the network device works in the unlicensed frequency band system, the network device may adopt different DMRS sequences to modulate the indication information. The terminal device may determine the working frequency band attribute or system attribute of the network device based on the DMRS sequence for successful demodulation of the PBCH.

Furthermore, initial scrambling sequences of the different DMRS sequences are optionally different.

In an example, when the working frequency band of the network device is the licensed frequency band or the network device works in the licensed frequency band system, the first DMRS sequence configured to generate the PBCH is:

$$r(m) = \frac{1}{\sqrt{2}}(1 - 2 \times c(2m)) + j\frac{1}{\sqrt{2}}(1 - 2 \times c(2m+1)).$$

There is made such a hypothesis that the initial scrambling sequence of the sequence r(m) is:

$$c_{int}=2^{11}(\bar{i}_{SBB}+1)(\lfloor N_{id}^{cell}/4 \rfloor+1)+2^6(\bar{i}_{SBB}+1)+N_{id}^{cell} \mod 4),$$

where $\bar{i}_{SBB}=4i_{SSB}+n_{hf}$, $n_{hf}$ is a half frame serial number in a subframe for transmission of the PBCH, and $i_{SSB}$ is the smallest significant bit size of an SSB index.

When the working frequency band of the network device is the unlicensed frequency band or the network device works in the unlicensed frequency band system, the second sequence configured to generate the PBCH is:

$$r(m) = \frac{1}{\sqrt{2}}(1 - 2 \times c(2m)) + j\frac{1}{\sqrt{2}}(1 - 2 \times c(2m+1)).$$

However, the initial scrambling sequence of the sequence is set to be:

$$c_{int}=2^{11}(\bar{i}_{SBB}+1)(\lfloor N_{id}^{cell}/4 \rfloor+1)+2^6(\bar{i}_{SBB}+1)+N_{id}^{cell} \mod 4+offset,$$

where $\bar{i}_{SBB}=4i_{SSB}+n_{hf}$, $n_{hf}$ is the half frame serial number in the subframe for transmission of the PBCH, and $i_{SSB}$ is the smallest significant bit size of the SSB index.

Then, the terminal device can determine the sequence for generation of the PBCH by detecting the PBCH from the network device. For different working frequency band attributes or different system attributes of the network device, initial sequences in the sequences r(m) are different, and thus the sequences r(m) are also different. Therefore, the terminal device can determine the working frequency band attribute or system attribute of the network device according to different sequences.

It is to be understood that, in the first manner, the implicit indication manner of the network device is described only with the sequence m for generation of the PSS and the DMRS sequence for modulation or demodulation of the PBCH as examples. The disclosure is not limited thereto and a manner of adopting another physical channel or another sequence for implicit indication shall also fall within the scope of protection of the disclosure.

A second manner is: explicit indication

Optionally, the indication information may contain an attribute identifier, and the attribute identifier may represent the working frequency band attribute or system attribute of the network device.

Before 210, the network device may determine the attribute identifier contained in the indication information according to the working frequency band attribute or the system attribute of the network device.

Correspondingly, before 220, the terminal device may determine the working frequency band attribute or system attribute of the network device according to a value of the attribute identifier contained in the indication information.

The value of the identifier may be a first numerical value when the working frequency band of the network device is the licensed frequency band or the network device works in the licensed frequency band system, the value of the identifier is a second numerical value when the working frequency band of the network device may be the unlicensed frequency band or the network device works in the unlicensed frequency band system, and the first numerical value may be different from the second numerical value.

That is, under situations that the working frequency band of the network device is the licensed frequency band and the working frequency band of the network device is the unlicensed frequency band respectively, the attribute identifier contained in the indication information has different values. Under situations that the network device works in the licensed frequency band system and the network device works in the unlicensed frequency band system, the attribute identifier contained in the indication information also has different values. The terminal device may determine the working frequency band attribute or system attribute of the network device according to the value of the attribute identifier contained in the indication information.

In an example, a reserved bit in the PBCH, like a reserved bit in a payload field in the PBCH, may be adopted. When a value of the bit is 1, it is indicated that the working frequency band of the network device is the unlicensed frequency band or the network device works in the unlicensed frequency band system. When the value of the bit is 0, it is indicated that the working frequency band of the network device is the licensed frequency band or the network device works in the licensed frequency band system.

In another example, the attribute identifier may be added to the PBCH, the RMSI or the OSI. When the value of the attribute identifier is 1, it is indicated that the working frequency band of the network device is the unlicensed frequency band or the system of the network device is the unlicensed frequency band system. When the value of the attribute identifier is 0, it is indicated that the working frequency band of the network device is the licensed frequency band or the system of the network device is the licensed frequency band system.

Optionally, when the working frequency band of the network device is the unlicensed frequency band or the network device works in the unlicensed frequency band system, the operation in 240 that the terminal device performs communication with the network device may include that: the terminal device performs communication with the network device based on an LBT mechanism.

Since the working frequency band of the network device is the unlicensed frequency band or the network device works in the unlicensed frequency band system, the terminal device needs to listen whether a channel is idle or not based on the LBT mechanism, and perform communication with the network device when determining that the channel is idle.

Therefore, even though different spectrum division manners are adopted in different countries or regions a terminal device can effectively acquire whether a frequency band of a network presently to access is an unlicensed frequency band or a licensed frequency band and thus perform a corresponding operation to implement effective data transmission in different frequency bands when the terminal device roams in different countries or regions.

It is to be understood that, in various embodiments of the disclosure, the sequence number of each process does not mean an execution order and the execution order of each process should be determined by its function and an internal logic and should not form any limit to an implementation process of the embodiments of the disclosure.

The communication method according to the embodiments of the disclosure is described above in detail and a device according to the embodiments of the disclosure will be described below in combination with FIG. 5 to FIG. 8. The technical characteristics described in the method embodiments are applied to the following device embodiments.

Figure 3:
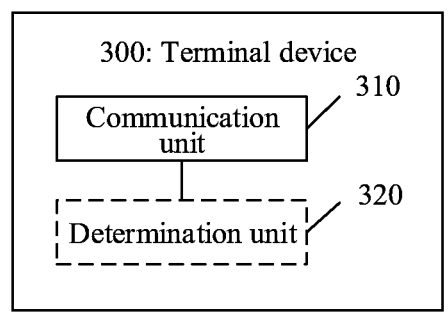
FIG. 3 is a schematic block diagram of a terminal device according to an embodiment of the disclosure.

FIG. 3 is a schematic block diagram of a terminal device 300 according to an embodiment of the disclosure. As shown in FIG. 3, the terminal device 300 includes a communication unit 310. The communication unit 310 is configured to:

receive indication information from a network device, the indication information indicating a working frequency band attribute or system attribute of the network device, the working frequency band attribute representing whether a working frequency band of the network device is a licensed frequency band or an unlicensed frequency band and the system attribute representing whether the network device works in a licensed frequency band system or an unlicensed frequency band system; and perform communication with the network device according to the working frequency band attribute or the system attribute.

Accordingly, the network device may indicate the working frequency band attribute or system attribute of the network device to the terminal device, and the terminal device may determine whether the working frequency band of the network device is the licensed frequency band or the unlicensed frequency band according to the working frequency band attribute indicated by the network device and thus may correspondingly perform an operation in the licensed frequency band or the unlicensed frequency band, or, the terminal device may determine whether the network device works in the licensed frequency band system or the unlicensed frequency band system according to the system attribute indicated by the network device and thus may correspondingly perform an operation in the licensed frequency band system or the unlicensed frequency band system. Therefore, effective data transmission is implemented. Optionally, the indication information may be any one of a PSS in an SSB, a PBCH in the SSB or RRC signaling.

Optionally, when the indication information is the PSS, the terminal device may further include a determination unit 320, configured to determine the working frequency band attribute or system attribute of the network device based on a sequence configured to generate the indication information.

The sequence configured to generate the indication information may be a first sequence when the working frequency band of the network device is the licensed frequency band or the network device works in the licensed frequency band system, the sequence configured to generate the indication information may be a second sequence when the working frequency band of the network device is the unlicensed frequency band or the network device works in the unlicensed frequency band system, and the first sequence and the second sequence may be different sequences.

Optionally, the different sequences may have different cyclic shift values.

Optionally, when the indication information is the PBCH, the terminal device may further include a determination unit 320, configured to determine the working frequency band attribute or system attribute of the network device according to a DMRS sequence for demodulating the indication information.

The DMRS sequence for demodulating the indication information may be a first DMRS sequence when the working frequency band of the network device is the licensed frequency band or the network device works in the licensed frequency band system, the DMRS sequence for demodulating the indication information may be a second DMRS sequence when the working frequency band of the network device is the unlicensed frequency band or the network device works in the unlicensed frequency band system, and the first DMRS sequence and the second DMRS sequence may be different DMRS sequences.

Optionally, the different DMRS sequences may have different initial scrambling sequences.

Optionally, the indication information may contain an attribute identifier, and the attribute identifier may represent the working frequency band attribute or system attribute of the network device. The terminal device may further include a determination unit 320, configured to determine the working frequency band attribute or system attribute of the network device according to a value of the attribute identifier contained in the indication information.

The value of the attribute identifier may be a first numerical value when the working frequency band of the network device is the licensed frequency band or the network device works in the licensed frequency band system, the value of the attribute identifier may be a second numerical value when the working frequency band of the network device is the unlicensed frequency band or the network device works in the unlicensed frequency band system, and the first numerical value may be different from the second numerical value.

Optionally, when the working frequency band of the network device is the unlicensed frequency band or the network device works in the unlicensed frequency band system, the communication unit 310 is specifically configured to perform communication with the network device according to the working frequency band attribute or the system attribute and in an LBT manner.

It is to be understood that the terminal device 300 may execute corresponding operations executed by the terminal device in the method 200 and, for simplicity, will not be elaborated herein.

Figure 4:
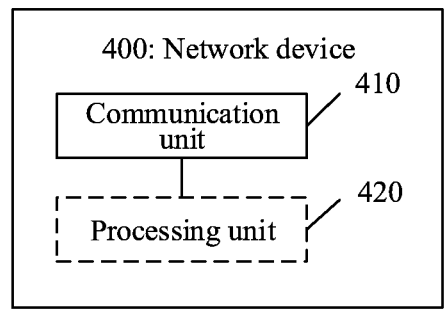
FIG. 4 is a schematic block diagram of a network device according to an embodiment of the disclosure.

FIG. 4 is a schematic block diagram of a network device 400 according to an embodiment of the disclosure. As shown in FIG. 4, the network device 400 includes a communication unit 410, configured to:

send indication information to a terminal device, the indication information indicating a working frequency band attribute or system attribute of the network device, the working frequency band attribute representing whether a working frequency band of the network device is a licensed frequency band or an unlicensed frequency band, and the system attribute representing whether the network device works in a licensed frequency band system or an unlicensed frequency band system; and perform communication with the terminal device according to the working frequency band attribute or the system attribute.

Accordingly, the network device may indicate the working frequency band attribute or system attribute of the network device to the terminal device, and the terminal device may determine whether the working frequency band of the network device is the licensed frequency band or the unlicensed frequency band according to the working frequency band attribute indicated by the network device and thus may correspondingly perform an operation in the licensed frequency band or the unlicensed frequency band, or, the terminal device may determine whether the network device works in the licensed frequency band system or the unlicensed frequency band system according to the system attribute indicated by the network device and thus may correspondingly perform an operation in the licensed frequency band system or the unlicensed frequency band system. Therefore, effective data transmission is implemented. Optionally, the indication information may be any one of a PSS in an SSB, a PBCH in the SSB, or RRC signaling.

Optionally, when the indication information is the PSS, the network device may further include a processing unit 420, configured to determine a sequence configured to generate the indication information according to the working frequency band attribute or the system attribute of the network device and generate the indication information based on the sequence.

The sequence configured to generate the indication information may be a first sequence when the working frequency band of the network device is the licensed frequency band or the network device works in the licensed frequency band system, the sequence configured to generate the indication information may be a second sequence when the working frequency band of the network device is the unlicensed frequency band or the network device works in the unlicensed frequency band system, and the first sequence and the second sequence may be different sequences.

Optionally, the different sequences may have different cyclic shift values.

Optionally, when the indication information is the PBCH, the network device may further include a processing unit 420, configured to determine a DMRS sequence configured to modulate the indication information according to the working frequency band attribute or the system attribute of the network device and modulate the indication information based on the DMRS sequence.

The DMRS sequence for demodulating the indication information may be a first DMRS sequence when the working frequency band of the network device is the licensed frequency band or the network device works in the licensed frequency band system, the DMRS sequence for demodulating the indication information may be a second DMRS sequence when the working frequency band of the network device is the unlicensed frequency band or the network device works in the unlicensed frequency band system, and the first DMRS sequence and the second DMRS sequence may be different DMRS sequences.

Optionally, the different DMRS sequences may have different initial scrambling sequences.

Optionally, the indication information may contain an attribute identifier, and the attribute identifier may represent the working frequency band attribute or system attribute of the network device. The network device may further include a processing unit 420, configured to determine the attribute identifier contained in the indication information according to the working frequency band attribute or the system attribute of the network device.

The value of the attribute identifier may be a first numerical value when the working frequency band of the network device is the licensed frequency band or the network device works in the licensed frequency band system, the value of the attribute identifier may be a second numerical value when the working frequency band of the network device is the unlicensed frequency band or the network device works in the unlicensed frequency band system, and the first numerical value may be different from the second numerical value.

It is to be understood that the network device 400 may perform corresponding operations executed by the network device in the method 200 and, for simplicity, will not be elaborated herein.

Figure 5:
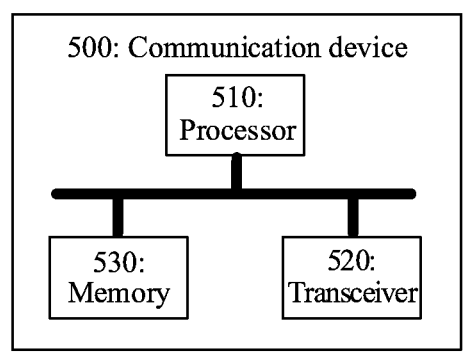
FIG. 5 is a schematic structure diagram of a communication device according to an embodiment of the disclosure.

FIG. 5 is a schematic structure diagram of a communication device 500 according to an embodiment of the disclosure. As shown in FIG. 5, the communication device includes a processor 510, a transceiver 520 and a memory 530. Herein, the processor 510, the transceiver 520 and the memory 530 communicate with one another through an internal connecting path. The memory 530 is configured to store instructions, and the processor 510 is configured to execute the instructions stored in the memory 530 to control the transceiver 520 to receive a signal or send a signal.

Optionally, the processor 510 may call the program codes stored in the memory 530 to perform corresponding operations, executed by a terminal device, in the method 200. For similarity, elaborations are omitted herein.

Optionally, the processor 510 may call the program codes stored in the memory 530 to perform corresponding operations, executed by a network device, in the method 200. For similarity, elaborations are omitted herein.

It is to be understood that the processor in the embodiment of the disclosure may be an integrated circuit chip and has a signal processing capability. In an implementation process, each step of the method embodiment may be completed by an integrated logical circuit of hardware in the processor or instructions in a software form. The processor may be a universal processor, a Digital Signal Processor (DSP), an Application Specific Integrated Circuit (ASIC), a Field Programmable Gate Array (FPGA) or another programmable logical device, discrete gate or transistor logical device and discrete hardware component. Each method, step and logical block diagram disclosed in the embodiments of the disclosure may be implemented or executed. The universal processor may be a microprocessor or the processor may also be any conventional processor and the like. The steps of the method disclosed in combination with the embodiments of the disclosure may be directly embodied to be executed and completed by a hardware decoding processor or executed and completed by a combination of hardware and software modules in the decoding processor. The software module may be located in a mature storage medium in this field such as a Random Access Memory (RAM), a flash memory, a Read-Only Memory (ROM), a Programmable ROM (PROM) or Electrically Erasable PROM (EEPROM) and a register. The storage medium is located in a memory, and the processor reads information in the memory, and completes the steps of the methods in combination with hardware.

It can be understood that the memory in the embodiment of the disclosure may be a volatile memory or a nonvolatile memory, or may include both the volatile and nonvolatile memories. The nonvolatile memory may be a ROM, a PROM, an Erasable PROM (EPROM), an EEPROM or a flash memory. The volatile memory may be a RAM, and can be used as an external high-speed cache. It is exemplarily but unlimitedly described that RAMs in various forms may be adopted, such as a Static RAM (SRAM), a Dynamic RAM (DRAM), a Synchronous DRAM (SDRAM), a Double Data Rate SDRAM (DDRSDRAM), an Enhanced SDRAM (ESDRAM), a Synchlink DRAM (SLDRAM) and a Direct Rambus RAM (DR RAM). It is to be noted that the memory of a system and method described in the disclosure is intended to include, but not limited to, memories of these and any other proper types.

Figure 6:
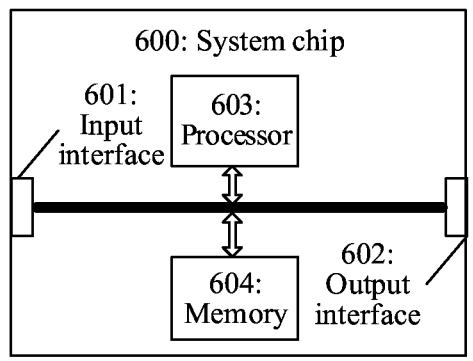
FIG. 6 is a schematic structure diagram of a system chip according to an embodiment of the disclosure.

FIG. 6 is a schematic structure diagram of a system chip according to an embodiment of the disclosure. The system chip 600 of FIG. 6 includes an input interface 601, an output interface 602, at least one processor 603 and a memory 604. The input interface 601, the output interface 602, the processor 603 and the memory 604 can be connected with one another through an internal connecting path. The processor 603 is configured to execute codes in the memory 604.

Optionally, when the codes are executed, the processor 603 may implement corresponding operations executed by a terminal device in the method 200. For simplicity, elaborations are omitted herein.

Optionally, when the codes are executed, the processor 603 may implement corresponding operations executed by a network device in the method 200. For simplicity, elaborations are omitted herein.

It is to be understood that, in the embodiments of disclosure, "B corresponding to A" represents that B is associated with A and B may be determined according to A. It is also to be understood that determining B according to A does not mean that B is determined only according to A. B also may be determined according to A and/or other information.

Those of ordinary skill in the art may realize that the units and algorithm steps of each example described in combination with the embodiments disclosed in the disclosure may be implemented by electronic hardware or a combination of computer software and the electronic hardware. Whether these functions are executed in a hardware or software manner depends on specific applications and design constraints of the technical solutions. Professionals may realize the described functions for each specific application by use of different methods, but such realization shall fall within the scope of the disclosure.

Those skilled in the art may clearly learn about that specific working processes of the system, device and unit described above may refer to the corresponding processes in the method embodiment and will not be elaborated herein for convenient and brief description.

In some embodiments provided by the disclosure, it is to be understood that the disclosed system, device and method may be implemented in another manner. In an example, the device embodiments described above are only schematic. For example, division of the units is only logic function division, and other division manners may be adopted during practical implementation. In an example, multiple units or components may be combined or integrated into another system, or some characteristics may be neglected or not executed. In addition, coupling or direct coupling or communication connection between each displayed or discussed component may be indirect coupling or communication connection, implemented through some interfaces, of the device or the units, and may be electrical and mechanical or adopt other forms.

The units described as separate parts may be or may not be physically separated, and parts displayed as units may be or may not be physical units, and namely may be located in the same place, or may also be distributed to multiple network units. Part or all of the units may be selected to achieve the purpose of the solutions of the embodiments according to a practical requirement.

In addition, each functional unit in each embodiment of the disclosure may be integrated into a processing unit, each unit may also physically exist independently, and two or more than two units may also be integrated into a unit.

When being realized in form of software functional unit and sold or used as an independent product, the function may also be stored in a computer-readable storage medium. Based on such an understanding, the technical solutions of the disclosure substantially or parts making contributions to the conventional art or part of the technical solutions may be embodied in form of software product, and the computer software product is stored in a storage medium, including a plurality of instructions configured to enable a computer device (which may be a personal computer, a server, a network device or the like) to execute all or part of the steps of the method in each embodiment of the disclosure. The storage medium includes: various media capable of storing program codes such as a U disk, a mobile hard disk, a ROM, a RAM, a magnetic disk or an optical disk.

The above is only the specific implementation mode of the disclosure and not intended to limit the scope of protection of the disclosure. Any variations or replacements apparent to those skilled in the art within the technical scope disclosed by the disclosure shall fall within the scope of protection of the disclosure. Therefore, the scope of protection of the disclosure shall be subject to the scope of protection of the claims.

The invention claimed is:

1. A communication method, comprising:
    receiving, by a terminal device, indication information from a network device, wherein the indication information is configured to indicate a working frequency band attribute or a system attribute of the network device, the working frequency band attribute is configured to represent whether a working frequency band of the network device is a licensed frequency band or an unlicensed frequency band and the system attribute is configured to represent whether the network device works in a licensed frequency band system or an unlicensed frequency band system; and
    performing, by the terminal device, communication with the network device according to the working frequency band attribute or the system attribute,
    wherein the indication information contains an attribute identifier, and the attribute identifier is configured to represent the working frequency band attribute or the system attribute of the network device;
    before performing, by the terminal device, communication with the network device according to the working frequency band attribute or the system attribute, the method further comprises:
        determining, by the terminal device, the working frequency band attribute or the system attribute of the network device according to a value of the attribute identifier contained in the indication information,
        wherein the value of the attribute identifier is a first numerical value when the working frequency band of the network device is the licensed frequency band or the network device works in the licensed frequency band system, and the value of the attribute identifier is a second numerical value when the working frequency band of the network device is the unlicensed frequency band or the network device works in the unlicensed frequency band system, the first numerical value being different from the second numerical value.

2. The communication method of claim 1, wherein the indication information is any one of:
    a primary synchronous signal (PSS) in a synchronous signal block (SSB), a physical broadcast channel (PBCH) in the SSB or radio resource control (RRC) signaling.

3. The communication method of claim 2, wherein when the indication information is the PSS, before performing, by the terminal device, communication with the network device according to the working frequency band attribute or the system attribute, the method further comprises:
    determining, by the terminal device, the working frequency band attribute or the system attribute of the network device based on a sequence configured to generate the indication information,
    wherein the sequence configured to generate the indication information is a first sequence when the working frequency band of the network device is the licensed frequency band or the network device works in the licensed frequency band system, and the sequence configured to generate the indication information is a second sequence when the working frequency band of the network device is the unlicensed frequency band or the network device works in the unlicensed frequency band system, the first sequence and the second sequence being different sequences.

4. The communication method of claim 3, wherein the different sequences have different cyclic shift values.

5. The communication method of claim 2, wherein when the indication information is the PBCH, before performing, by the terminal device, communication with the network device according to the working frequency band attribute or the system attribute, the method further comprises:
    determining, by the terminal device, the working frequency band attribute or the system attribute of the network device based on a demodulation reference signal (DMRS) sequence for demodulating the indication information,
    wherein the DMRS sequence for demodulating the indication information is a first DMRS sequence when the working frequency band of the network device is the licensed frequency band or the network device works in the licensed frequency band system, and the DMRS sequence for demodulating the indication information is a second DMRS sequence when the working frequency band of the network device is the unlicensed frequency band or the network device works in the unlicensed frequency band system, the first DMRS sequence and the second DMRS sequence being different DMRS sequences.

6. The communication method of claim 5, wherein the different DMRS sequences have different initial scrambling sequences.

7. The communication method of claim 1, wherein, when the working frequency band of the network device is the unlicensed frequency band or the network device works in the unlicensed frequency band system, performing, by the terminal device, communication with the network device comprises:
    performing, by the terminal device, communication with the network device in a listen before talk (LBT) manner.

8. A communication method, comprising:
    sending, by a network device, indication information to a terminal device, wherein the indication information is configured to indicate a working frequency band attribute or a system attribute of the network device, the working frequency band attribute is configured to represent whether a working frequency band of the network device is a licensed frequency band or an unlicensed frequency band, and the system attribute is configured to represent whether the network device works in a licensed frequency band system or an unlicensed frequency band system; and performing, by the network device, communication with the terminal device according to the working frequency band attribute or the system attribute, wherein the indication information contains an attribute identifier, and the attribute identifier is configured to represent the working frequency band attribute or the system attribute of the network device;

before sending, by the network device, the indication information to the terminal device, the method further comprises:
determining, by the network device, the attribute identifier contained in the indication information according to the working frequency band attribute or the system attribute of the network device,
wherein a value of the attribute identifier is a first numerical value when the working frequency band of the network device is the licensed frequency band or the network device works in the licensed frequency band system, and the value of the attribute identifier is a second numerical value when the working frequency band of the network device is the unlicensed frequency band or the network device works in the unlicensed frequency band system, the first numerical value being different from the second numerical value.

9. The communication method of claim 8, wherein the indication information is any one of:
a primary synchronous signal (PSS) in a synchronous signal block (SSB), a physical broadcast channel (PBCH) in the SSB or radio resource control (RRC) signaling.

10. A terminal device, comprising:
a transceiver, configured to receive indication information from a network device, wherein the indication information is configured to indicate a working frequency band attribute or a system attribute of the network device, the working frequency band attribute is configured to represent whether a working frequency band of the network device is a licensed frequency band or an unlicensed frequency band and the system attribute is configured to represent whether the network device works in a licensed frequency band system or an unlicensed frequency band system, and the transceiver further configured to perform communication with the network device according to the working frequency band attribute or the system attribute, wherein the indication information contains an attribute identifier, and the attribute identifier is configured to represent the working frequency band attribute or the system attribute of the network device;

the terminal device further comprises a processor connected with the transceiver and configured to:
determine the working frequency band attribute or the system attribute of the network device according to a value of the attribute identifier contained in the indication information,
when the value of the attribute identifier is a first numerical value when the working frequency band of the network device is the licensed frequency band or the network device works in the licensed frequency band system, and the value of the attribute identifier is a second numerical value when the working frequency band of the network device is the unlicensed frequency band or the network device works in the unlicensed frequency band system, the first numerical value being different from the second numerical value.

11. The terminal device of claim 10, wherein the indication information is any one of:
a primary synchronous signal (PSS) in a synchronous signal block (SSB), a physical broadcast channel (PBCH) in the SSB or radio resource control (RRC) signaling.

12. The terminal device of claim 10, wherein, when the working frequency band of the network device is the unlicensed frequency band or the network device works in the unlicensed frequency band system, the transceiver is specifically configured to:
perform communication with the network device in a listen before talk (LBT) manner according to the working frequency band attribute or the system attribute.

13. A network device, comprising:
a transceiver, configured to send indication information to a terminal device, the indication information indicating a working frequency band attribute or a system attribute of the network device, the working frequency band attribute being configured to represent whether a working frequency band of the network device is a licensed frequency band or an unlicensed frequency band and the system attribute being configured to represent whether the network device works in a licensed frequency band system or an unlicensed frequency band system, and the transceiver further configured to perform communication with the terminal device according to the working frequency band attribute or the system attribute, wherein the indication information contains an attribute identifier, and the attribute identifier is configured to represent the working frequency band attribute or the system attribute of the network device;

the network device further comprises a processor connected with the transceiver and configured to:
determine the working frequency band attribute or the system attribute of the network device according to a value of the attribute identifier contained in the indication information,
when the value of the attribute identifier is a first numerical value when the working frequency band of the network device is the licensed frequency band or the network device works in the licensed frequency band system, and the value of the attribute identifier is a second numerical value when the working frequency band of the network device is the unlicensed frequency band or the network device works in the unlicensed frequency band system, the first numerical value being different from the second numerical value.

14. The network device of claim 13, wherein the indication information is any one of:
a primary synchronous signal (PSS) in a synchronous signal block (SSB), a physical broadcast channel (PBCH) in the SSB or radio resource control (RRC) signaling.

15. The network device of claim 14 wherein when the indication information is the PSS, the processor is configured to:
determine a sequence configured to generate the indication information according to the working frequency band attribute or the system attribute of the network device and generate the indication information based on the sequence, wherein the sequence configured to generate the indication information is a first sequence when the working frequency band of the network device is the licensed frequency band or the network device works in the licensed frequency band system, and the sequence configured to generate the indication information is a second sequence when the working frequency band of the network device is the unlicensed frequency band or the network device works in the unlicensed frequency band system, the first sequence and the second sequence being different sequences.

16. The network device of claim 15, wherein the different sequences have different cyclic shift values.

17. The network device of claim 14, wherein when the indication information is the PBCH, the processor is configured to:

determine a demodulation reference signal (DMRS) sequence configured to modulate the indication information according to the working frequency band attribute or the system attribute of the network device and modulate the indication information based on the DMRS sequence, wherein the DMRS sequence for demodulating the indication information is a first DMRS sequence when the working frequency band of the network device is the licensed frequency band or the network device works in the licensed frequency band system, and the DMRS sequence for demodulating the indication information is a second DMRS sequence when the working frequency band of the network device is the unlicensed frequency band or the network device works in the unlicensed frequency band system, the first DMRS sequence and the second DMRS sequence being different DMRS sequences.

* * * * *